United States Patent

[11] 3,631,661

[72] Inventors Fedor Nikolaevich Volkov
Kotelnicheskaya naberezhnaya, 1/15, korpus B, kv. 53;
Mikhail Grigorievich Negrimovsky, ul. Raevskogo, 3, kv. 15; Alexei Nikolaevich Pasik, Institutsky proezd, 6, kv. 25, all of, Moscow, U.S.S.R.
[21] Appl. No. 819,198
[22] Filed Apr. 25, 1969
[45] Patented Jan. 4, 1972

[54] HAYMAKING MACHINE WHEREIN LEAVES ARE SEPARATED FROM STALKS IN THE COURSE OF HAY TRANSPORTATION
3 Claims, 4 Drawing Figs.

[52] U.S. Cl. .................................................. 56/364,
56/1, 56/350, 130/21
[51] Int. Cl. ...................................................... A01d 89/00
[50] Field of Search ............................................. 130/21;
56/25.4, 1, 344, 345, 350, 351, 352, 353, 358, 359, 364

[56] References Cited
UNITED STATES PATENTS
| | | | |
|---|---|---|---|
| 916,310 | 3/1909 | Henderson .................... | 56/358 |
| 1,082,191 | 12/1913 | George .......................... | 130/21 |
| 3,058,284 | 10/1962 | Anderson ...................... | 56/25.4 |

*Primary Examiner*—Russell R. Kinsey
*Attorney*—Waters, Roditi, Schwartz & Nissen ABSTRACT: A haymaking machine facilitating separation of leaves from their stalks connected to the hay during the course of transportation of the hay, adapted to pick up a stack of hay, feeding it into a container, separating from the hay leaves which are loosely attached to their stalks and pressing them into cylindrical granules.

The machine comprises a frame, wheels for moving the machine along the ground, a pickup attachment for hay, and means for the conveyance, separation and pressing of the separated leaves into granules. The machine also includes containers for collecting the hay and the granulated leaves.

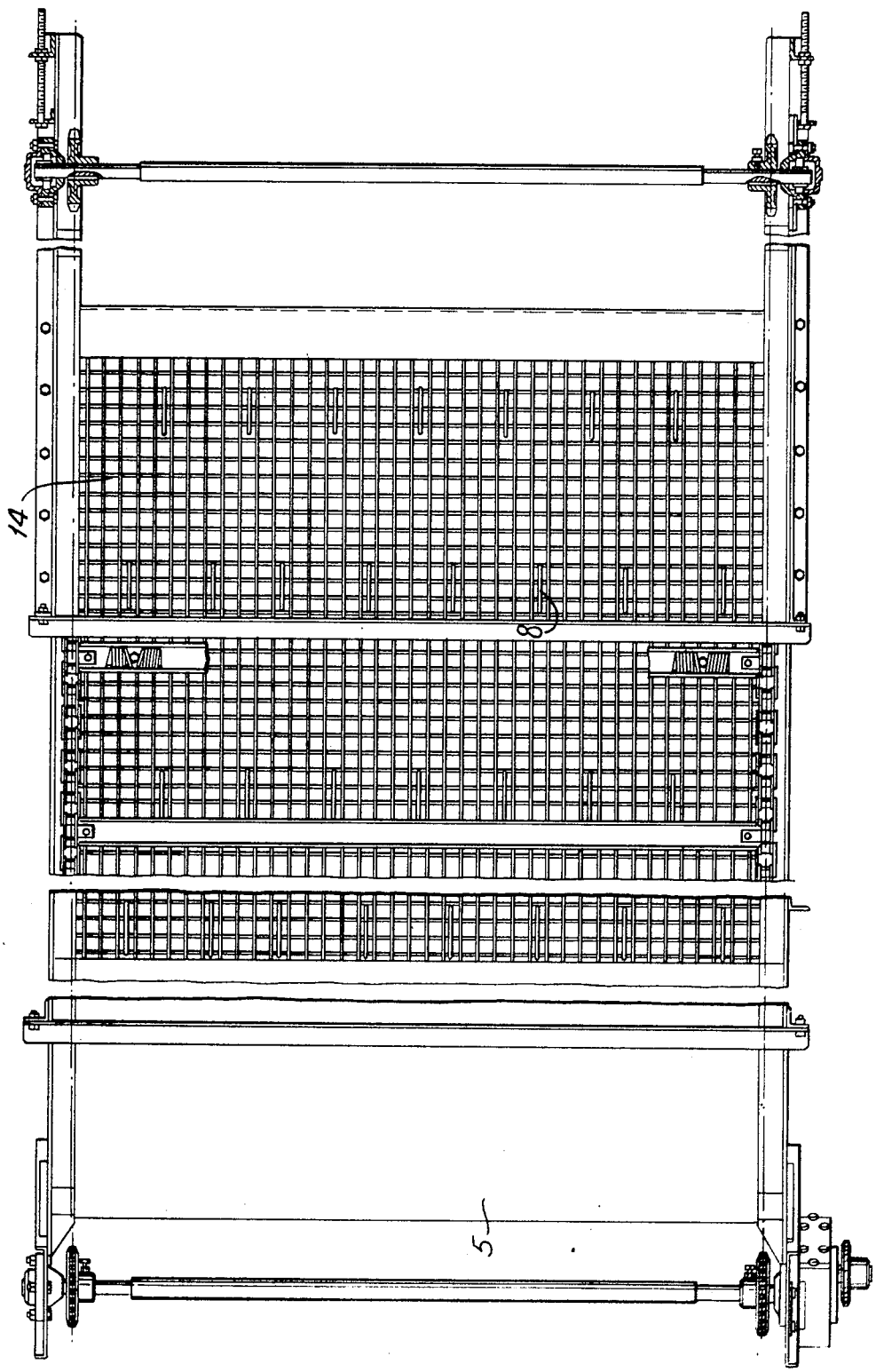

HAYMAKING MACHINE WHEREIN LEAVES ARE SEPARATED FROM STALKS IN THE COURSE OF HAY TRANSPORTATION

The present invention relates to haymaking machines wherein leaves are separated from stalks in the course of the hay transportation.

Known in the prior art are haymaking machines wherein leaves are separated from stalks in the course of the hay transportation, comprising a pickup attachment and an arrangement for transportation of leaves and separation thereof from stalks.

In one of said machines the arrangement for transportation of leaves and separation thereof from stalks is made as two conveyors mounted one above the other, the belts of the conveyors moving in one direction at different speeds.

In another machine the arrangement for transportation of leaves and separation thereof from stalks comprises two rollers mounted one above the other and rotating in opposite directions, a fan adapted for sucking leaves separated from stalks, and a conveyor delivering the rest of the hay into a hay stacker.

In the prior art machines the leaves separated from stalks, though occupying a considerable space, have a small specific weight, as a result of which they are not convenient for transportation and storage.

Furthermore, in the prior art machines both the belts of the conveyors of the first machine, moving at different speeds, and the rollers of the other machine, rotating in opposite directions, do not provide for sufficiently intensive separation of leaves from stalks.

Furthermore, the first-mentioned machine does not provide for adequate separation of leaves.

Due to the difficulty encountered when providing stable operation of the fan (sucking leaves) under field conditions, the latter of said machines is not reliable in operation.

In accordance with the foregoing the object of the present invention resides in the provision of such a haymaking machine which would ensure quality separation, transportation and storage of leaves, and which would be reliable in operation.

In the furtherance of this and other objects of the invention the proposed haymaking machine has a device for pressing leaves which is mounted in the path of leaves separated from the stalks on the hay.

It is advantageous to make the device for pressing leaves as a rotary-type press disposed below the arrangement used for the conveyance of the hay containing the leaves and separation of the latter from stalks attaching the leaves to the hay.

In the present haymaking machine the arrangement for transportation of leaves and separation thereof from stalks may consist essentially of an inclined conveyor having a belt which mounts spring-loaded pins, and a chute whose upper portion is perforate and disposed above the rotary-type press, and which is provided with pins inclined in the direction of the movement of the lower run of the conveyor belt.

The following description of an exemplary embodiment of the present invention is given with reference to the accompanying drawings, in which:

FIG. 4 is a top view of the arrangement of FIG. 3.

Figure 1:
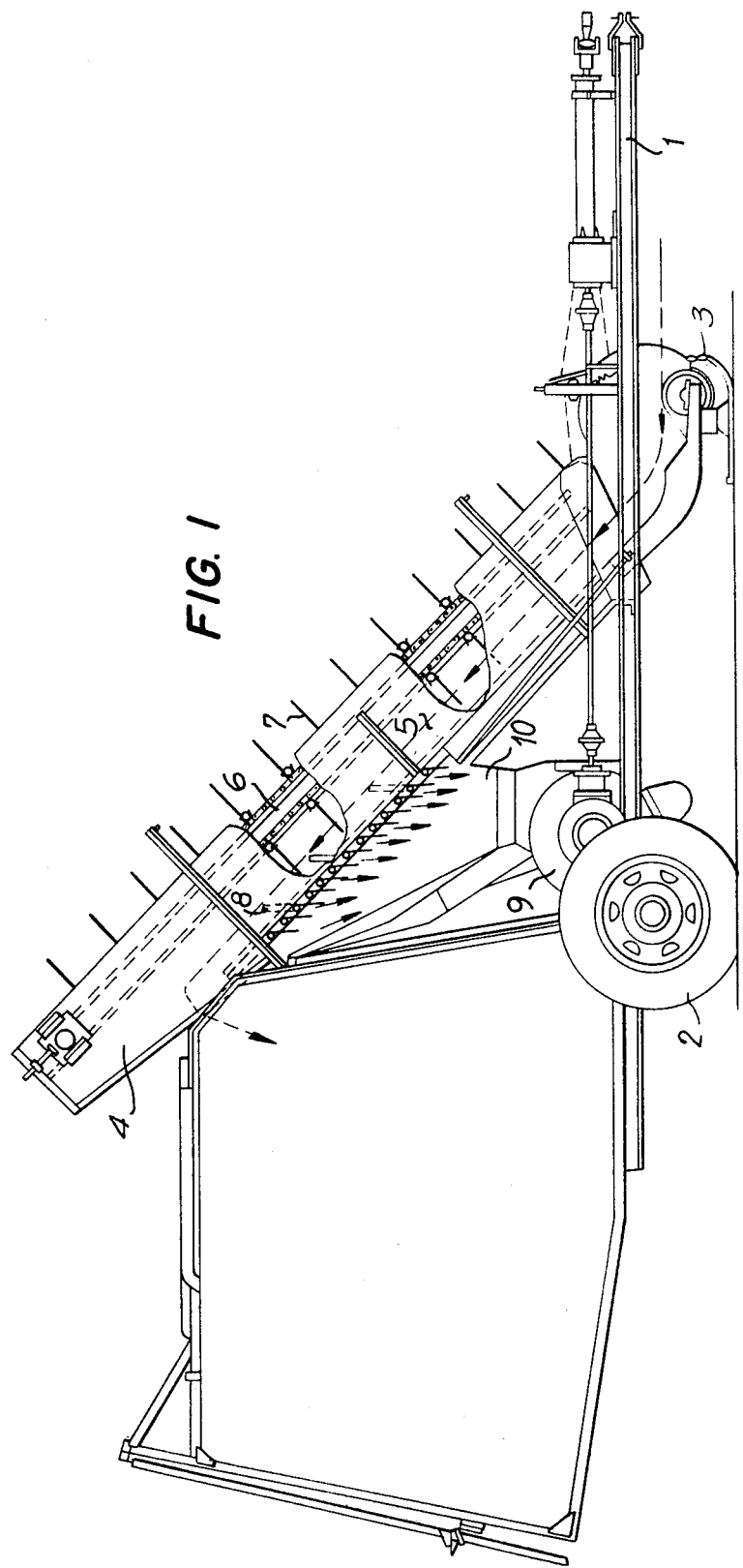
FIG. 1 shows an elevational view, with portions broken away and omitted, of the haymaking machine in which leaves are separated from stalks.

The haymaking machine comprises a frame 1 (FIG. 1) resting upon travelling wheels 2; hinged to the frame 1 is a drum-type pickup attachment 3 used for picking up hay from a swath along the ground and delivering it to an arrangement used for transportation of leaves and separation thereof from stalks, which arrangement comprises an inclined conveyor 4 and chute 5.

Figure 2:
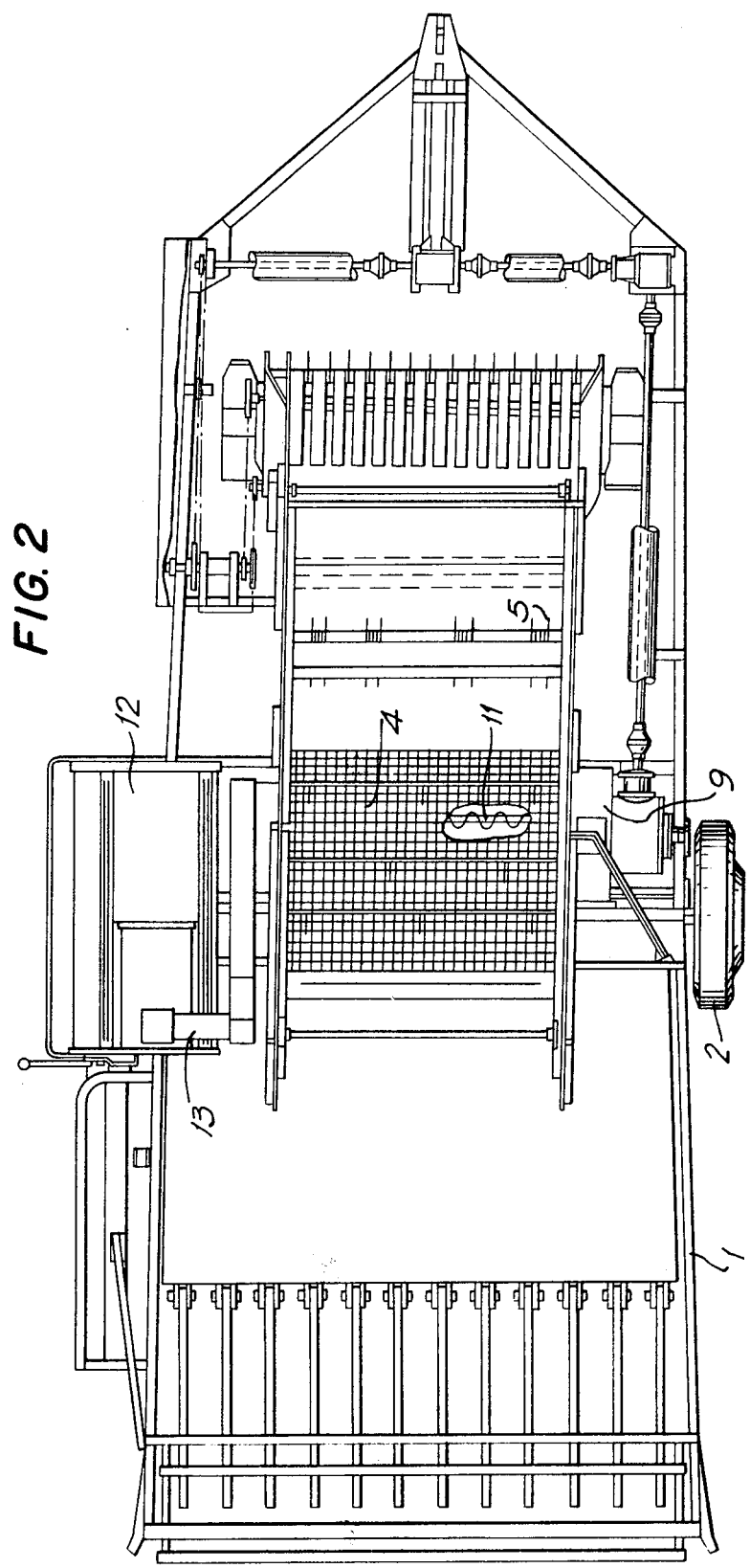
FIG. 2 shows a top plan view of the machine illustrated in FIG. 1.

The inclined conveyor 4 comprises a continuous belt having spring-biased pins 7 secured thereon. The chute 5 disposed under the lower run of the belt 6 of the conveyor 4 is made perforated in its upper portion and has pins 8 inclined in the direction of the movement of the conveyor belt. Disposed at a side of the conveyor and under the perforated portion of the chute 5 is a device for pressing leaves which is essentially a rotary-type press 9 for crushing leaves and pressing them into granules. The press 9 is connected to a feeder made as a hopper 10 disposed directly under the perforated portion of the chute 5, and screw conveyor 11 (FIG. 2) feeding the separated leaves into the press.

To transport pressed leaves to a collector 12, the machine is provided with an elevator 13.

Figure 3:
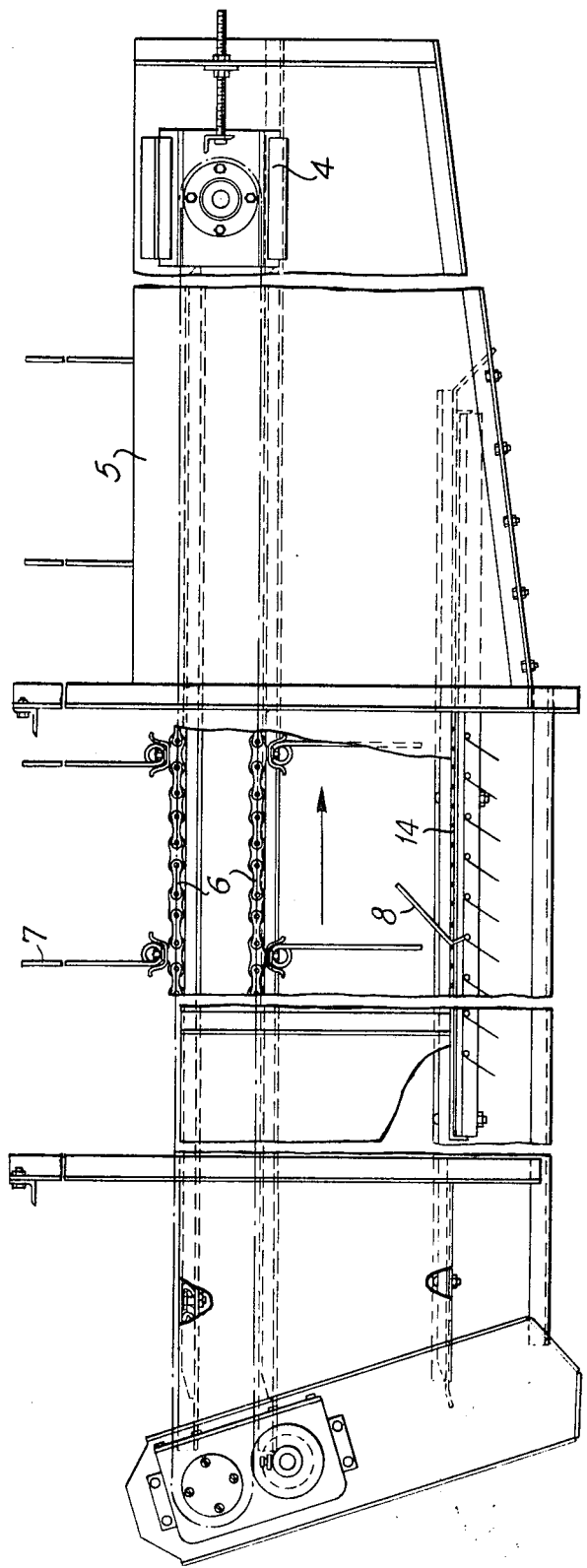
FIG. 3 shows, on an enlarged scale, the arrangement for the conveyance of the hay with separation of the leaves loosely attached to their stalks.

The hay from the roller is gripped by the pickup attachment 3, and is transported by the spring-biased pins 7 of the lower run 6 of the conveyor 4 along the chute 5 and its perforated portion. While being carried upward by pins 7, the hay encounters in its path inclined pins 8, passes over or around a side of generating an interaction between the hay and the pins which ensures separation from the stack of hay leaves which are detached from their stalks. As a result of interaction of conveyor pins 7 with the pins 8 leaves loosely attached to their stalks will be separated therefrom. Proper cooperative functioning between the pins 7 and 8 is ensured be a definite compliance with design parameters of the parts and the proper arrangement of the latter (FIGS. 3 and 4). As a result of this, loose and usually falling leaves are separated from stalks, drop through the perforated portion of the chute 5 and get inside the press 9. In the press, the dry leaves are compressed and crushed into small particles which are then pressed into granules of generally cylindrical shape.

From the rotary-type press 9 the pressed leaves are delivered to the elevator 13, and further, to the collector 12. As the collector 12 is filled up, the leaves are unloaded into the body of a lorry to be transported for consumption and long storage.

With the leaves separated from stalks and pressed into granules, the quality of the rest of the hay is not adversely affected, since it is only the leaves that usually fall out that are separated.

Since the leaves contain the main bulk of vitamins and nutrients, they constitute a more nutritious part of the hay when pressed into granules.

What is claimed is:

1. A haymaking machine wherein leaves are adapted to be separated from their stalks during the course of transportation of the hay, comprising; a frame supported on wheels for movement along the ground, hay pickup attachment means for picking up a stack of hay from the ground connected to said frame, an inclined conveyor installed adjacent said pickup attachment means so as to receive hay from the latter, pin means on said conveyor for gripping the hay conveyed thereon, a container for collection of the hay conveyed by said conveyor, a chute disposed below said conveyor extending along the direction of movement of the hay, on said conveyor, said chute including means for separating leaves from the hay positioned below the discharge end of said conveyor, means for pressing the separated leaves into granules, said pressing means being disposed below said separating means and adapted to receive leaves therefrom; conveyor means; and a hopper for collecting the granules, said conveyor adapted to convey the granules from said pressing means to said hopper.

2. A haymaking machine as claimed in claim 1 wherein the means for pressing leaves comprises essentially a rotary-type press.

3. A haymaking machine as claimed in claim 1 wherein the means for separating leaves comprises a portion of the chute disposed below said inclined conveyor, said chute portion being perforate, pins means on said chute portion positioned in staggered rows and inclined in the direction of motion of the hay along said conveyor, said pins means in cooperation with the pins on said inclined conveyor being adapted to detach at least a portion of the leaves from their stalks so as to separate said leaves from the hay during conveyance by said conveyor.

* * * * *